United States Patent [19]

Sahoda et al.

[11] Patent Number: 4,701,877
[45] Date of Patent: Oct. 20, 1987

[54] HIGHSPEED PARALLEL ADDER WITH CLOCKED SWITCHING CIRCUITS

[75] Inventors: Masayuki Sahoda, Yokohama; Fuminari Tanaka, Kawasaki; Tetsuya Iida, Yokohama, all of Japan

[73] Assignee: Kabushiki Kaisha Toshiba, Kawasaki, Japan

[21] Appl. No.: 675,303

[22] Filed: Nov. 27, 1984

[30] Foreign Application Priority Data

Nov. 28, 1983 [JP] Japan .................................. 58-223553

[51] Int. Cl.⁴ ................................................ G06F 7/50
[52] U.S. Cl. ..................................... 364/784; 364/786
[58] Field of Search ................................ 364/784, 786

[56] References Cited

U.S. PATENT DOCUMENTS 4,052,604  10/1977  Maitland et al. ..................... 364/786
4,523,292   6/1985  Armer et al. ........................ 364/786
4,601,007   7/1986  Uya et al. ............................ 364/784

OTHER PUBLICATIONS

Japanese Patent Disclosure (KOKAI) Nos. 56-147235, and 56-147236, Nov. 16, 1981.

Primary Examiner—David H. Malzahn
Attorney, Agent, or Firm—Finnegan, Henderson, Farabow, Garrett & Dunner

[57] ABSTRACT

In a parallel adder circuit, first and second full adders each having an addend input terminal, an augend input terminal, a sum output terminal, a carry input terminal, and a carry output terminal are alternately connected such that the carry output terminal of the preceding full adder is directly connected to the carry input terminal of the succeeding full adder. In order to shorten the carry propagation delay time, the first full adder is arranged to receive an inverted carry signal (FALSE) from the preceding stage and to provide a carry signal (TRUE) to the succeeding stage, while the second full adder is arranged to receive a carry signal (TRUE) from the preceding stage and to provide an inverted carry signal (FALSE) to the succeeding stage.

15 Claims, 21 Drawing Figures

F I G. 5A
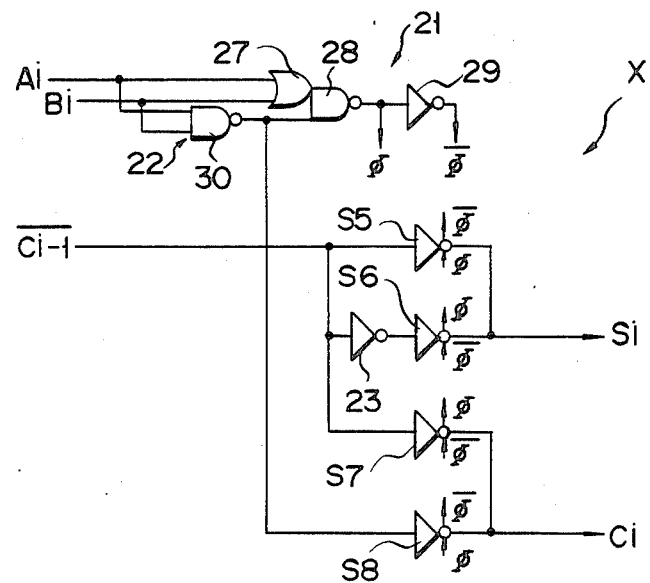
F I G. 5B
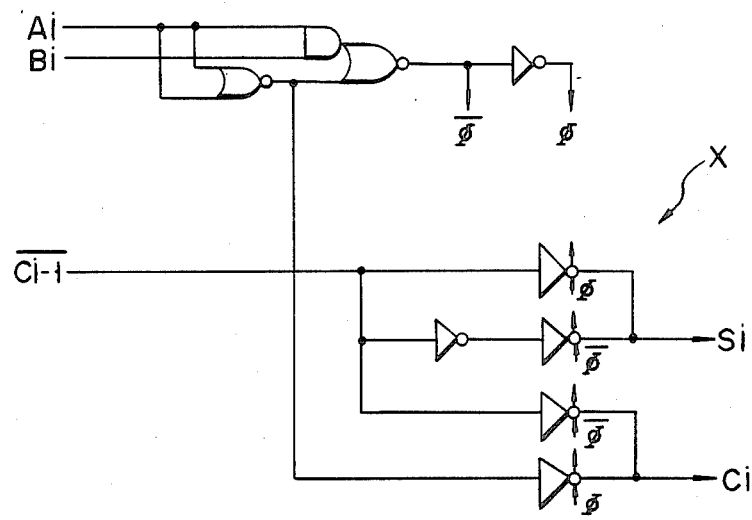

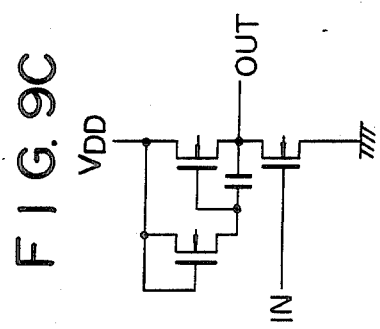
FIG. 8
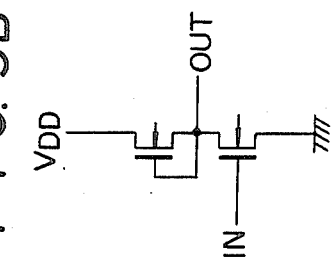
FIG. 9A
FIG. 9B
FIG. 9C
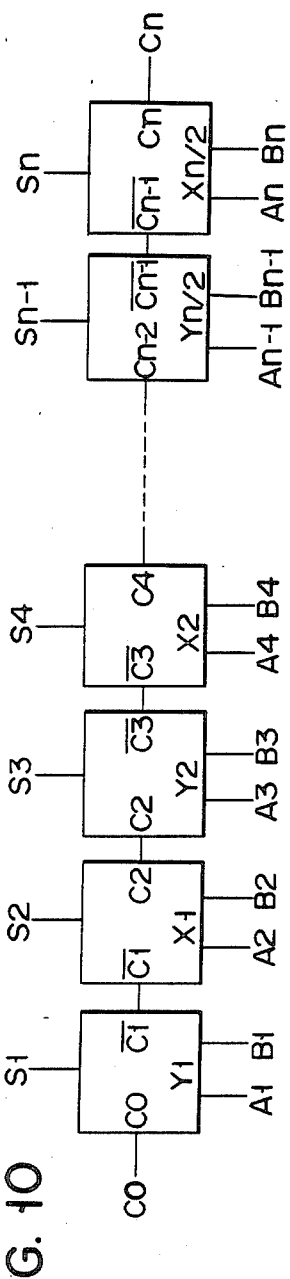
FIG. 10

4,701,877

HIGHSPEED PARALLEL ADDER WITH CLOCKED SWITCHING CIRCUITS

BACKGROUND OF THE INVENTION

The present invention relates to an adder circuit and, more particularly, to a parallel adder circuit.

With a multidigit parallel adder circuit which is to be operated at a high speed, it is necessary to significantly shorten the propagation delay time between a carry input and a carry output of an adder circuit.

A conventional parallel adder circuit is constituted by a full adder as shown in, e.g., FIG. 1. In FIG. 1, $A_i$ denotes an addend input; $B_i$ is an augend input; $C_{i-1}$ is a carry input from the preceding stage; $S_i$ a sum output; $C_i$ is a carry output to the succeeding stage; reference numerals 11 and 12 indicate EX-OR (EXCLUSIVE OR) gate circuits; and reference numerals 13, 14 and 15 indicate NAND gate circuits.

In the full adder shown in FIG. 1, a propagation delay time corresponding to two stages of the NAND gate circuits is involved in generating the carry signal; furthermore, the time delay corresponding to one stage of the EX-OR gate circuit occurs until the sum output $S_i$ is obtained.

A full adder to improve such drawbacks is shown in FIG. 2 and is disclosed in Japanese Laid-Open Patent Application Nos. 147235/1981 and 147236/1981. This adder comprises: a control circuit including an OR gate circuit 16, a NAND gate circuit 17 and an inverter 18; an input circuit having an NAND gate circuit 19; and a switching circuit including an inverter 20 and clocked inverters $S_1$ to $S_4$. The control circuit is arranged to provide a control signal $\phi$ which becomes high when an addend input is equal to an augend input. A control signal $\bar{\phi}$ is complementary to signal $\phi$. On the other hand, the clocked inverters $S_1$ and $S_4$ operate when the control signal $\phi$ is high, while the clocked inverters $S_2$ and $S_3$ operate when the inverted control signal $\bar{\phi}$ is high.

The arrangement of the full adder in FIG. 2 is very simple and the maximum time delay in the carry propagation is involved only with the switching circuit including the inverter 20. Also, the clocked inverters $S_1$ to $S_4$ whose operating speed is faster than an NAND gate circuit are used as the switching circuit. Consequently, this full adder is very advantageous for a high speed operation.

However, even in such a full adder, a maximum time delay for the carry propagation occurs due to the inverter 20 and clocked inverter $S_1$. Therefore, a conventional multistage adder circuit having such full adders as described above does not have satisfactory carry propagation.

SUMMARY OF THE INVENTION

It is an object of the present invention to provide full adder circuits which can constitute a parallel adder circuit arranged to shorten the carry propagation delay time.

It is another object to provide a parallel adder circuit which can shorten the carry propagation delay time.

According to a parallel adder circuit of the invention, first and second full adders each having an addend input terminal, an augend input terminal, a sum output terminal, a carry input terminal, and a carry output terminal are alternately connected such that the carry output terminal of the preceding-stage full adder is connected to the carry input terminal of the succeeding-stage full adder.

The first full adder comprises a first control circuit responsive to an addend input signal and an augend input signal applied to the addend input terminal and augend input terminal for providing a first switch control signal which becomes a first logical level when the addend input signal and augend input signal are equal and which becomes a second logical level when the input signals are not equal, a first input circuit connected to receive the addend and augend input signals to provide a NAND output signal or a NOR output signal of the input signals or an inverted signal of one of the input signals as an output signal, and a first switching circuit having first to fourth inverting type switching means, the first and fourth switching means being arranged to conduct when the first switch control signal from the first control circuit is at the first logical level, the second and third switching means being arranged to conduct when the first switch control signal from the first control circuit is at the second logical level, the first and second switching means being connected to respectively receive a carry inverted input signal from the preceding stage that is applied to the carry input terminal and its inverted signal, and having their outputs connected together to the sum output terminal, and the third and fourth switching means being connected to respectively receive the carry inverted input signal from the preceding stage that is applied to the carry input terminal and the output signal from the first input circuit, and having their outputs connected together to the carry output terminal.

The second full adder comprises a second control circuit responsive to the addend input signal and augend input signal applied to the addend input terminal and augend input terminal for providing a second switch control signal which becomes the first logical level when the addend input signal and augend input signal are equal and which becomes the second logical level when the input signals are not equal, a second input circuit connected to receive the addend and augend input signals to provide one of the input signals as an output signal, and a second switching circuit having fifth to eighth inverting type switching means, the sixth and eighth switching means being arranged to conduct when the second switch control signal from the second control circuit is at the first logical level, the fifth and seventh switching means being arranged to conduct when the second switch control signal from the second control circuit is at the second logical level, the fifth and sixth switching means being connected to respectively receive a carry input signal from the preceding stage applied to the carry input terminal and its inverted signal, and having their outputs connected together to the sum output terminal, and the seventh and eighth switching means being connected to respectively receive the carry input signal from the preceding stage applied to the carry input terminal and the output signal from the second input circuit, and having their outputs connected together to the carry output terminal.

BRIEF DESCRIPTION OF THE DRAWINGS

FIGS. 5A–5D and 6A–6D show practical arrangements of the full adders of FIGS. 3 and 4, respectively;

FIGS. 8 and 9A–9C show partial modifications of the full adder of the invention; and FIG. 10 shows an arrangement of a parallel adder of the invention.

DESCRIPTION OF THE PREFERRED EMBODIMENTS

FIG. 10 shows an arrangement of a parallel adder circuit according to the present invention in which first full adders $X_1$ to $X_{n/2}$ and second full adders $Y_1$ to $Y_{n/2}$ are alternately connected. The first full adders $X_1$ to $X_{n/2}$ receive an inverted carry input $\overline{C}_{i-1}$ and provide a carry output $C_i$. The second full adders $Y_1$ to $Y_{n/2}$ receive a carry input $C_{i-1}$ and provide an inverted carry output $\overline{C}_i$.

Figure 1:
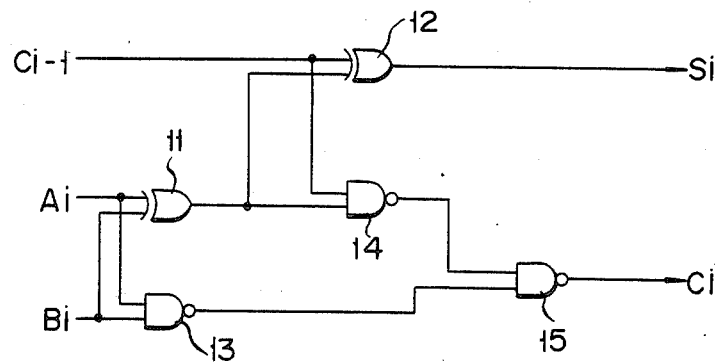
FIGS. 1 and 2 show conventional full adders for use in a parallel adder.
Figure 2:
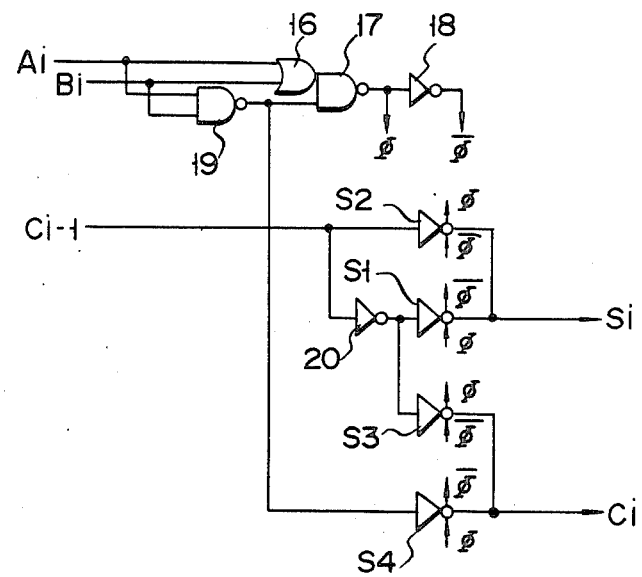
Figure 3:
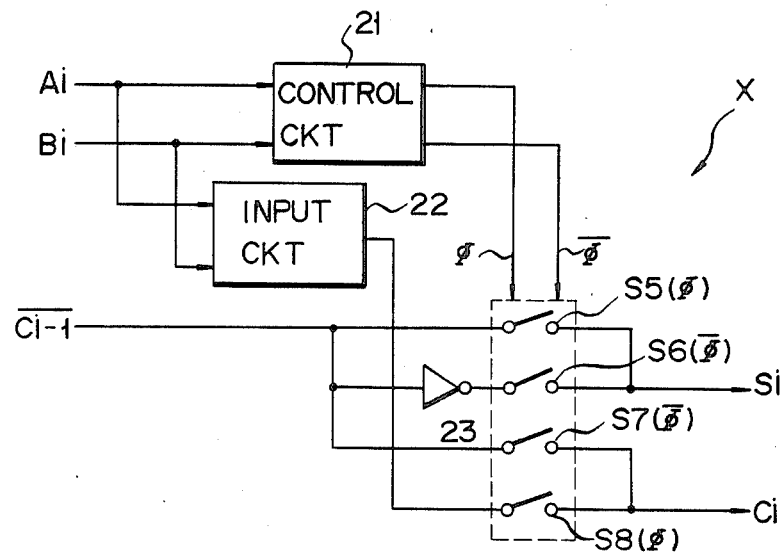
FIGS. 3 and 4 respectively show arrangements of first and second full adders of the present invention for use in a parallel adder.
Figure 4:
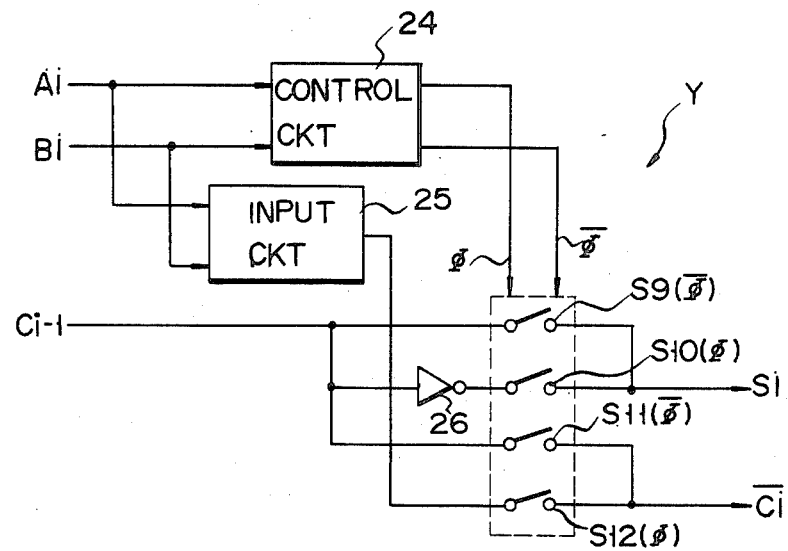

FIGS. 3 and 4 show basic arrangements of the first and second full adders X and Y, respectively. That is, in the first full adder X shown in FIG. 3, the addend input $A_i$ and augend input $B_i$ are supplied to a control circuit 21 and an input circuit 22. The control circuit 21 provides a control signal $\phi$ which becomes high when $A_i = B_i$, and its inverted control signal $\bar{\phi}$. The input circuit 22 provides a NAND or NOR output of $A_i$ and $B_i$ or provides an inverted signal of one of $A_i$ and $B_i$. The output of the input circuit 22 is coupled to a switching circuit $S_8$.

In addition, as mentioned above, the carry inverted input $\overline{C}_{i-1}$ is received and applied to the first full adder X. The carry inverted input $\overline{C}_{i-1}$ is applied to switching circuits $S_5$ and $S_7$ and, through an inverter 23, to a switching circuit $S_6$. The switching circuits $S_5$ to $S_8$ are controlled by the control signals $\phi$ and $\bar{\phi}$ and are inverting type switches which invert an input signal when they are ON. The switching circuits $S_5$ and $S_8$ are turned on when the control signal $\phi$ goes high and turned off when the control signal $\phi$ goes low. The switching circuits $S_6$ and $S_7$ are turned on when the control signal $\bar{\phi}$ goes high and are turned off when the control signal $\bar{\phi}$ goes low. Outputs of the switching circuits $S_5$ and $S_6$ are connected together to provide a sum output $S_i$ and outputs of the switching circuits $S_7$ and $S_8$ are connected together to provide the carry output $C_i$.

Next, in the second full adder Y shown in FIG. 4, the addend input $A_i$ and augend input $B_i$ are applied to a control circuit 24 and an input circuit 25 as in the first full adder X. The control circuit 24 is identical to the control circuit 21. However, the input circuit 25 is arranged to provide one of $A_i$ and $B_i$. The output of the input circuit 25 is applied to a switching circuit $S_{12}$.

On the other hand, the carry input $C_{i-1}$ is applied to the second adder Y. This carry input $C_{i-1}$ is applied to switching circuits $S_9$ and $S_{11}$ and through an inverter 26 to a switching circuit $S_{10}$. These switching circuits $S_9$ to $S_{12}$ are controlled by the control signals $\phi$ and $\bar{\phi}$ and are inverting type switches like the switching circuits $S_5$ to $S_8$. The switching circuits $S_{10}$ and $S_{12}$ are turned on when the control signal $\phi$ becomes high and are turned off when the control signal $\phi$ becomes low. The switching circuits $S_9$ and $S_{11}$ are turned on when the control signal $\bar{\phi}$ goes high and are turned off when the control signal $\bar{\phi}$ goes low. Outputs of the switching circuits $S_9$ and $S_{10}$ are connected together to provide the sum output $S_i$ and outputs of the switching circuits $S_{11}$ and $S_{12}$ are connected together to provide the carry inverted output $\overline{C}_i$.

FIGS. 5A–5D and 6A–6B show practical circuit arrangements of the first and second full adders X and Y shown in FIGS. 3 and 4, respectively. In the first full adder X shown in FIG. 5A, the control circuit 21 is composed of an OR gate circuit 27, an NAND gate circuit 28 and an inverter 29, while the input circuit 22 is composed of a NAND gate circuit 30. The output of the input circuit 22 is taken from an output of the NAND gate circuit 30. The switching circuits $S_5$ to $S_8$ are constituted by clocked inverters having well-known C-MOS arrangements shown in FIGS. 7A to 7D.

Figure 6A:
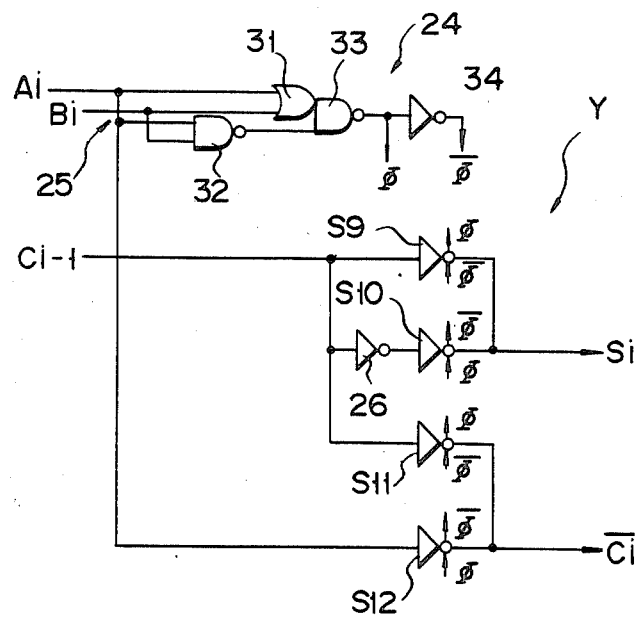

In the second full adder Y shown in FIG. 6A, the control circuit 24 comprises an OR gate circuit 31, NAND gate circuits 32 and 33 and an inverter 34, while the input circuit 25 is arranged to provide the addend input $A_i$ directly. The switching circuits $S_9$ to $S_{12}$ are constituted by the clocked inverters shown in FIGS. 7A to 7D.

The operations of the first and second full adders X and Y of FIGS. 5A–5D and 6A–6D will now be described below.

In the first full adder X, when the addend input $A_i$ and augend input $B_i$ are applied, the control signals $\phi$ and $\bar{\phi}$ are provided by the control circuit 21, so that the clocked inverters $S_5$ to $S_8$ are accordingly controlled. When the carry inverted input $\overline{C}_{i-1}$ is input, and $A_i = B_i$, the clocked inverters $S_5$ and $S_8$ are operative and the clocked inverters $S_6$ and $S_7$ are inoperative. Thus, the output of the input circuit 22 is inverted by the clocked inverter $S_8$ to be output from the carry output terminal $C_i$. When $A_i \neq B_i$, the clocked inverters $S_5$ and $S_8$ are inoperative and the clocked inverters $S_6$ and $S_7$ are operative; therefore, the carry inverted input $\overline{C}_{i-1}$ is inverted by the clocked inverter $S_7$ to be output from the carry output terminal $C_i$.

Next, in the second full adder Y, when the addend input $A_i$ and augend input $B_i$ are applied, the control signals $\phi$ and $\bar{\phi}$ are output from the control circuit 24, so that the clocked inverters $S_9$ to $S_{12}$ are accordingly controlled. When $A_i = B_i$, the clocked inverters $S_{10}$ and $S_{12}$ are operating and the clocked inverters $S_9$ and $S_{11}$ are inoperative. Therefore, the output of the input circuit 25 is inverted by the clocked inverter $S_{12}$ to be output from the carry inverted output terminal $\overline{C}_i$. In contrast, when $A_i \neq B_i$, the clocked inverters $S_{10}$ and $S_{12}$ are inoperative and the clocked inverters $S_9$ and $S_{11}$ are operating. Thus, the carry input $C_{i-1}$ is inverted by the clocked inverter $S_{11}$ to be output from the carry inverted output terminal $\overline{C}_i$.

In the first and second full adders X and Y, the carry propagation delay times are caused by only one stage of clocked inverter. Therefore, as shown in FIG. 10, when the first and second full adders $X_1$ to $X_{n/2}$ and $Y_1$ to $Y_{n/2}$ are alternately connected, inverting circuits the number of which corresponds to the number of stages can be omitted in the carry propagation path.

Consequently, as compared with a conventional adder circuit whereby the delay time corresponding to two stages of gate circuits is needed as the carry propagation delay time of each full adder, the carry propagation delay time of each full adder of this invention equals the delay time corresponding to one stage of the switching circuit consisting of the clocked inverter. Thus, the carry propagation delay time can be significantly shortened. The invention is very advantageous for making a parallel adder circuit of a plurality of bits, such as an adder circuit having a long bit length.

Figure 5C:
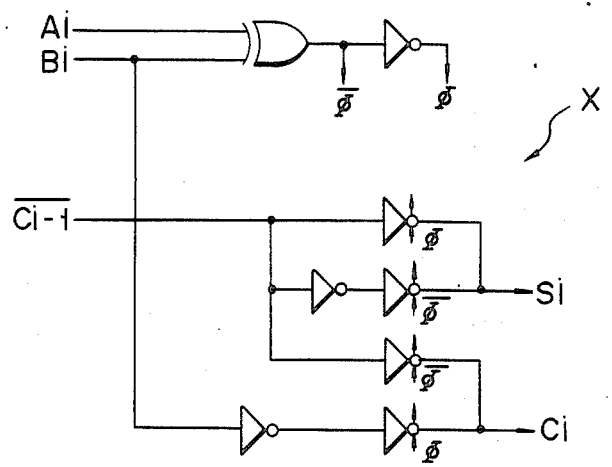
Figure 5D:
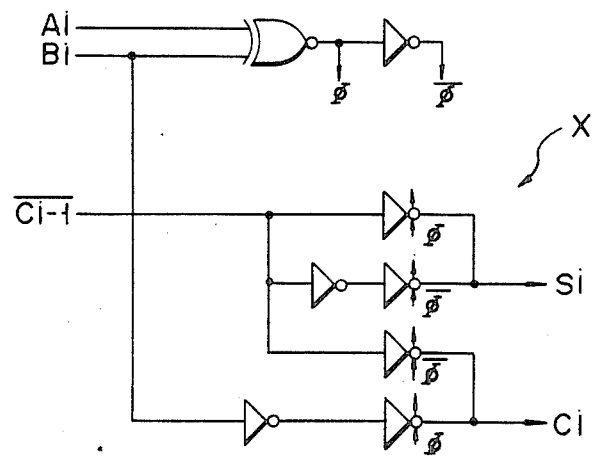
Figure 6B:
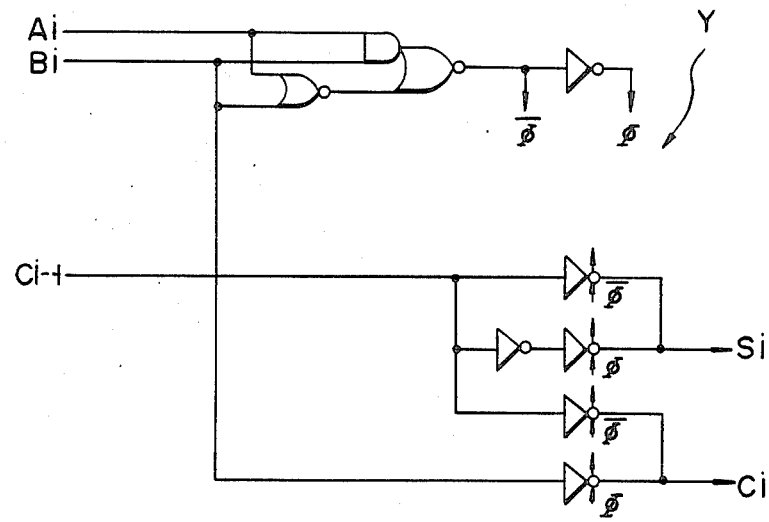
Figure 6C:
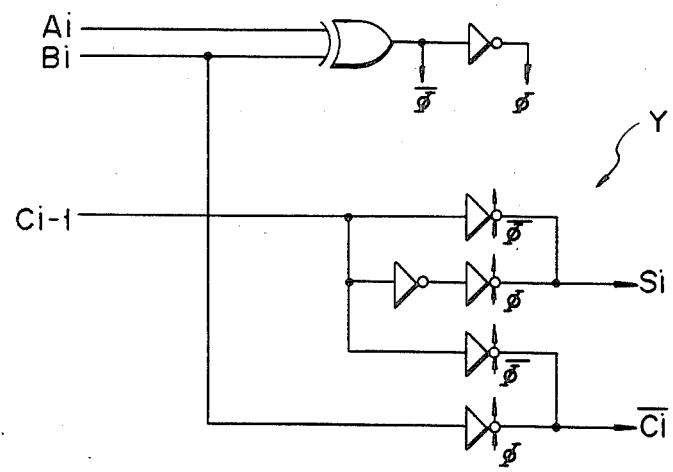
Figure 6D:
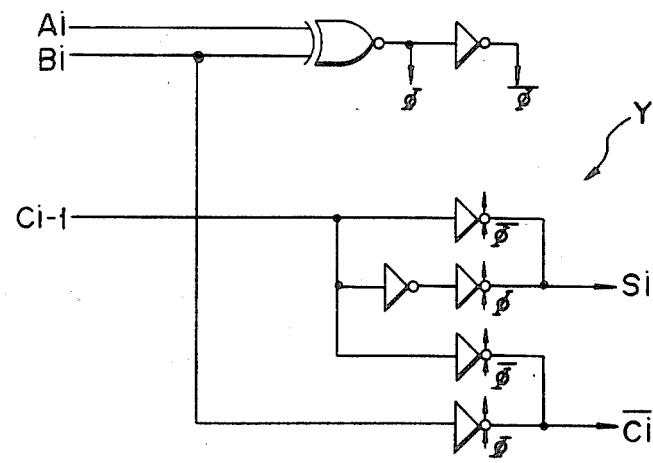
Figure 7A:
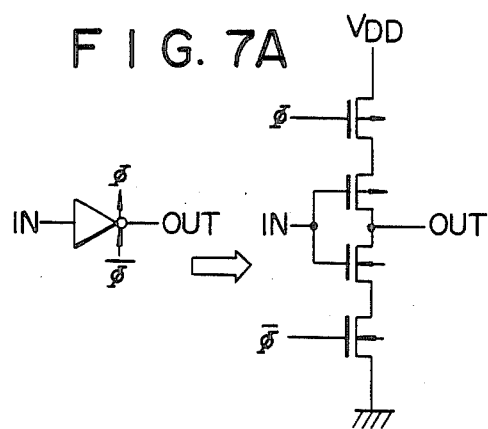
FIGS. 7A–7D are a circuit diagram of clocked inverters.
Figure 7B:
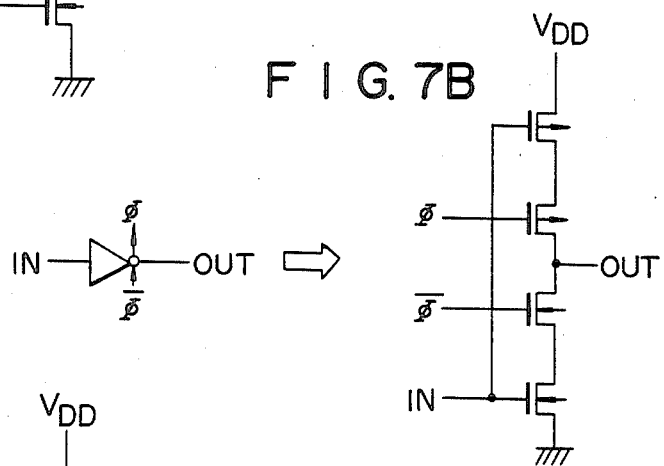
Figure 7C:
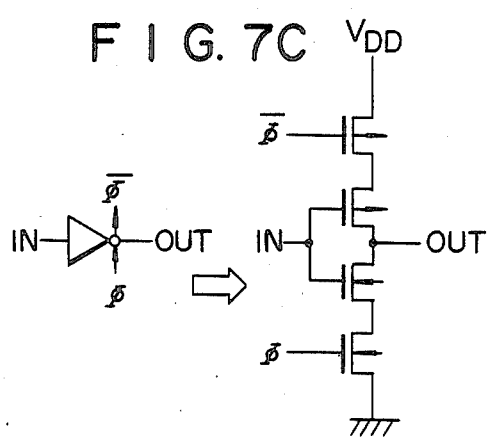
Figure 7D:
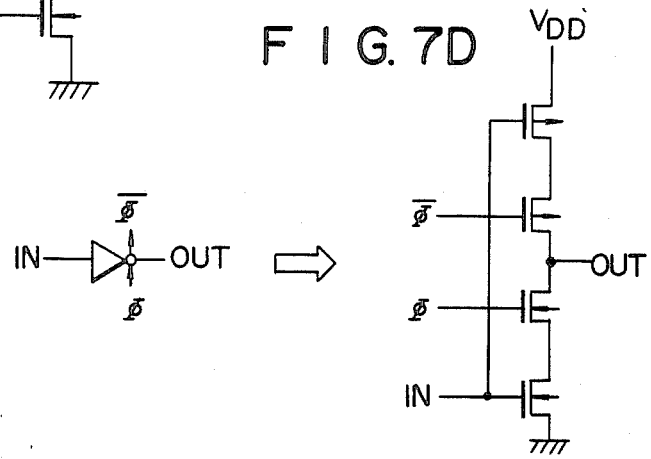

The full adder circuit of FIG. 5A may be modified as shown in FIGS. 5B to 5D and the full adder circuit of FIG. 6a may be modified as shown in FIGS. 6B to 6D. In the switching circuit, a transmission gate circuit having an n-channel type MOS arrangement shown in FIG. 8 may be used in place of the clocked inverter having the C-MOS arrangement. Further, as the inverter, a C-MOS type, an n-channel MOS type and a bootstrap type as shown in FIGS. 9A to 9C, respectively, may be adopted.

What is claimed is:

1. A full adder circuit comprising:
   an addend input terminal, an augend input terminal, a sum output terminal, a carry input terminal, and a carry output terminal;
   a control circuit responsive to an addend input signal and an augend input signal applied to said addend input terminal and said augend input terminal, respectively, for providing a switch control signal which has a first logic level when the addend and augend input signals are equal and a second logic level when the addend and augend input signals are not equal;
   input circuit means, responsive to at least one of said addend and augend input signals, for providing an output signal based on said addend or augend input signal; and
   switching means, coupled to receive said output signal of said input circuit and said switch control signal, for providing a carry output signal and a sum output signal at said carry output terminal and said sum output terminal, respectively, said switching means including first to fourth clocked inverting switches for inverting signals at their inputs when enabled by said switch control signal from said control circuit,
   said first inverting switch having an output and having an input connected to receive a carry input signal applied to said carry input terminal,
   said second inverting switch having an input connected to receive an inverse signal of the carry input signal and having an output connected to the output of said first inverting switch and to said sum output terminal,
   said third inverting switch means having an output and having an input being connected to the input of said first inverting swtich to receive the carry input signal, and
   said fourth inverting switch having an input connected to receive the output signal of said input circuit and having an output connected to the output of said third inverting switch and to said carry output terminal,
   wherein one of said first and second inverting switches and one of said third and fourth of said third and fourth inverting switches are enabled when said switch control signal is at the first logic level, and
   wherein the other of said first and second switches and the other of said third and fourth switches are enabled when said switch control signal is at the second logic level.

2. A full adder circuit according to claim 1, wherein said control circuit includes means for producing complementary switch control signals in response to said addend and augend input signals.

3. A full adder circuit according to claim 1, wherein said input circuit comprises a NAND gate connected to receive the addend and augend input signals to provide the output signal.

4. A full adder circuit according to claim 1, wherein said input circuit comprises a NOR gate connected to receive the addend and augend input signals to provide the output signal.

5. A full adder circuit according to claim 1, wherein said input circuit comprises an inverter connected to receive one of the addend and augend input signals to provide the output signal.

6. A full adder circuit according to claim 1, wherein said first and fourth inverting switches are concurrently enabled when said switch control signal is at the first logic level, and wherein said second and third inverting switches are concurrently enabled when said switch control signal is at the second logic level.

7. A full adder circuit according to claim 1, wherein said second and fourth inverting switches are concurrently enabled when said switch control signal is at the first logic level, and wherein said first and third inverting switches are concurrently enabled when said switch control signal is at the second logic level.

8. A full adder circuit comprising:
   an addend input terminal, an augend input terminal, a sum output terminal, a carry input terminal, and a carry output terminal;
   a control circuit responsive to an addend input signal and an augend input signal applied to said addend input terminal and said augend input terminal, respectively, for providing a switch control signal which has a first logic level when the addend and augend input signals are equal and a second logic level when the addend and augend signals are not equal;
   an input circuit for providing one of the addend input signal and the augend input signal as an output signal; and
   switching means, coupled to receive said output signal of the input circuit and said switch control signal, for providing a carry output signal and a sum output signal at said carry output terminal and said sum output terminal, respectively, said switching including first to fourth clocked inverting switches for inverting signals at their inputs when enabled by said switch control signal provided by said control circuit,
   said first inverting switch having an output and having an input connected to receive a carry input applied to said carry input terminal;
   said second inverting switch having an input coupled to receive an inverse of the carry input signal and an output connected to the output of said first inverting switch and to said sum output terminal,
   said third inverting switch having an output and having an input connected to said input of said first inverting switch to receive the carry input signal, and
   said fourth inverting switch having an input connected to receive the output signal of said input circuit and having an output connected to the output of said third inverting switch and to said carry output terminal,
   wherein one of said first and second inverting switches and one of said third and fourth inverting switches are enabled when said switch control signal is at the first logic level, and wherein the other of said first and second inverting switches and the other of said third and fourth inverting switches are enabled when said switch control signal is at the second logic level.

9. A full adder circuit according to claim 8, wherein said control circuit includes means for producing complementary switch control signals in response to said addend and augend input signals.

10. A parallel adder circuit comprising:
first and second full adders each having an addend input terminal, an augend input terminal, a sum output terminal, a carry input terminal, and a carry output terminal, said first and second full adders being alternately connected such that the carry output terminal of a preceding full adder is connected to the carry input terminal of a succeeding full adder, and said first full adders and second full adders producing carry output signals in inverted relation to each other,
each of said first and second full adders including:
a control circuit responsive to an addend input signal and an augend input signal applied to said addend input terminal and said augend input terminal, respectively, for providing a switch control signal which has a first logic level when the addend and augend input signals are equal and a second logic level when the addend and augend input signals are not equal;
input circuit means, responsive to at least one of said addend and augend input signals for providing an output signal based on said addend or augend input signals; and
switching means, coupled to receive said output signal of the input circuit means and said switch control signal, for providing a carry output signal and a sum output signal at said carry output terminal and said sum output terminal, respectively, said switching means including first to fourth clocked inverting switches for inverting signals at their inputs in response to said switch control signal provided by said control circuit,
said first inverting switch having an output and having an input connected to receive a carry input signal applied to said carry input terminal,
said second inverting switch having an input connected to receive an inverse of the carry input signal and having an output connected to said output of said first inverting switch and to said sum output terminal,
said third inverting switch having an output and having an input connected to the input of said first inverting switch to receive the carry input signal,
said fourth inverting switch having an input connected to receive the output signal of said input circuit means and having an output connected to the output of the fourth inverting switch and to said carry output terminal,
wherein one of said first and second inverting switches and one of said third and fourth innverting switches are enabled when the switch control signal is at the first logic level, and
wherein the other of said first and second inverting switches and the other of said third and fourth inverting switches are enabled when the switch control signal is at the second logic level;
said first and fourth inverting switches of said first full adder being concurrently enabled when the switching signal is at the first logic level, and said second and third inverting switches of said first full adder being concurrently enabled when the switch control signal is at the second logic level; and
said second and fourth inverting switches of said second full adder being concurrently enabled when the switch control signal is at the first logic level, and said first and third inverting switches of said second full adder being concurrently enabled when the switch control signal is at the second logic level.

11. A parallel adder circuit according to claim 10, wherein each said control circuit includes means for producing complementary switch control signals in response to said addend and the augend input signals.

12. A parallel adder circuit according to claim 10, wherein each said input circuit comprises a NAND gate connected to receive the addend and the augend input signals to provide the output signal.

13. An adder circuit according to claim 10, wherein each said input circuit comprises a NOR gate connected to receive the addend and augend input signals to provide the output signal.

14. A parallel adder circuit according to claim 10, wherein each said input circuit comprises an inverter connected to receive the addend or augend input signals to provide the output signal.

15. A parallel adder circuit according to claim 10, wherein said input circuit comprises means for providing one of the addend and augend input signals as the output signal.

* * * * *